(12) United States Patent
Kasukawa et al.

(10) Patent No.: US 9,174,298 B2
(45) Date of Patent: *Nov. 3, 2015

(54) DISSIMILAR METAL JOINING METHOD FOR MAGNESIUM ALLOY AND STEEL

(75) Inventors: Minoru Kasukawa, Yokosuka (JP); Shigeyuki Nakagawa, Yokosuka (JP); Kenji Miyamoto, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/061,190

(22) PCT Filed: Aug. 26, 2009

(86) PCT No.: PCT/JP2009/064817
§ 371 (c)(1),
(2), (4) Date: Feb. 28, 2011

(87) PCT Pub. No.: WO2010/026892
PCT Pub. Date: Mar. 11, 2010

(65) Prior Publication Data
US 2011/0159313 A1 Jun. 30, 2011

(30) Foreign Application Priority Data

Sep. 8, 2008 (JP) ................................. 2008-229655
Jun. 26, 2009 (JP) ................................. 2009-152569

(51) Int. Cl.
*B32B 15/00* (2006.01)
*B23K 11/20* (2006.01)
(Continued)

(52) U.S. Cl.
CPC ............... *B23K 11/20* (2013.01); *B23K 11/115* (2013.01); *B23K 13/01* (2013.01); *B23K 20/023* (2013.01);
(Continued)

(58) Field of Classification Search
None
See application file for complete search history.

(56) References Cited

U.S. PATENT DOCUMENTS 3,066,392 A 12/1962 Kanter et al.
5,599,467 A 2/1997 Okabe et al.
(Continued)

FOREIGN PATENT DOCUMENTS

CN 1978119 A 6/2007
CN 101043968 A 9/2007
(Continued)

OTHER PUBLICATIONS

JP2006-231343 English Machine Translation, Kenji et l., Sep. 2006.*
(Continued)

*Primary Examiner* — Mark Ruthkosky
*Assistant Examiner* — Daniel J Schleis
(74) *Attorney, Agent, or Firm* — Foley & Lardner LLP

(57) ABSTRACT

[Object] To provide a joining method for dissimilar metals which are magnesium alloy and steel and difficult to be metallurgically directly joined to each other while oxide film is present at a joining surface.
[Solving Means] In order to join magnesium alloy material 1 and steel plate 2 to each other, a galvanized steel plate to which Zn—Al—Mg alloy plating (a third material) is applied is used as the steel plate 2. When joining is made, ternary eutectic melting of Al—Mg—Zn is caused, so that it is discharged together with oxide film 1f and impurities from the joining interface while Al—Mg intermetallic compound such as $Al_3Mg_2$ and Fe—Al intermetallic compound such as $FeAl_3$ are formed, thereby joining the newly generated surfaces of the magnesium alloy material 1 and the steel plate 2 to each other through a compound layer 3 containing these intermetallic compounds.

2 Claims, 4 Drawing Sheets

(51) Int. Cl.
*B23K 11/11* (2006.01)
*B23K 13/01* (2006.01)
*B23K 20/02* (2006.01)
*B23K 20/12* (2006.01)
*B23K 20/16* (2006.01)
*B23K 20/227* (2006.01)
*B23K 26/24* (2014.01)
*B23K 26/32* (2014.01)
*B32B 15/01* (2006.01)
*C22C 18/04* (2006.01)

(52) U.S. Cl.
CPC .............. *B23K 20/122* (2013.01); *B23K 20/16* (2013.01); *B23K 20/227* (2013.01); *B23K 26/246* (2013.01); *B23K 26/324* (2013.01); *B32B 15/013* (2013.01); *C22C 18/04* (2013.01); *B23K 2201/34* (2013.01); *B23K 2203/18* (2013.01); *Y10T 428/12729* (2015.01)

(56) References Cited

U.S. PATENT DOCUMENTS

| | | | |
|---|---|---|---|
| 7,850,059 B2 | 12/2010 | Kobayashi et al. | |
| 7,935,908 B2 | 5/2011 | Nakagawa et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 2004/0048096 A1 | 3/2004 | Doh et al. | |
| 2004/0262269 A1 | 12/2004 | Matile | |
| 2006/0150387 A1 | 7/2006 | Kobayashi et al. | |
| 2008/0026247 A1 | 1/2008 | Nakagawa et al. | |
| 2008/0241572 A1 | 10/2008 | Miyamoto et al. | |
| 2009/0050608 A1* | 2/2009 | Hayashi et al. | 219/121.14 |
| 2011/0052935 A1* | 3/2011 | Nakagawa et al. | 428/649 |
| 2011/0123825 A1 | 5/2011 | Sakurai et al. | |
| 2011/0159313 A1 | 6/2011 | Kasukawa et al. | |

FOREIGN PATENT DOCUMENTS

| | | | |
|---|---|---|---|
| JP | 59-225893 A | 12/1984 | |
| JP | 01-154886 A | 6/1989 | |
| JP | 04-127973 A | 4/1992 | |
| JP | 04-143083 A | 5/1992 | |
| JP | 04-251676 A | 9/1992 | |
| JP | 05-065272 B2 | 9/1993 | |
| JP | 06-039558 A | 2/1994 | |
| JP | 07-155964 A | 6/1995 | |
| JP | 09-122924 A | 5/1997 | |
| JP | 2000-272541 A | 10/2000 | |
| JP | 2001-252777 A | 9/2001 | |
| JP | 2002-241962 A | 8/2002 | |
| JP | 3335036 B2 | 8/2002 | |
| JP | 2004-122171 A | 4/2004 | |
| JP | 2004-195493 A | 7/2004 | |
| JP | 2006-175502 A | 7/2006 | |
| JP | 2006-198679 A | 8/2006 | |
| JP | 2006-231343 A | 9/2006 | |
| JP | 2006-326613 A | 12/2006 | |
| JP | 2007-105737 A | 4/2007 | |
| JP | 2007-105737 A | 4/2007 | |
| JP | 2007-130686 A | 5/2007 | |
| JP | 2007-130686 A | 5/2007 | |
| JP | 2007-326146 A | 12/2007 | |
| JP | 2007-330973 A | 12/2007 | |
| JP | 2008-6465 A | 1/2008 | |
| JP | 2008-23583 A | 2/2008 | |
| JP | 2009-279605 A | 12/2009 | |
| JP | 2253410 A1 | 11/2010 | |
| WO | WO-03/022511 A1 | 3/2003 | |
| WO | 2006046608 | * 5/2006 | |
| WO | WO 2009/091049 A1 | 7/2009 | |

OTHER PUBLICATIONS

"Aluminum and Aluminum Alloy Sheets and Plates, Strips, and Coiled Sheets", JIS (Japanese Industrial Standard) H 4000, 1999, pp. 829-903.

"Cold-reduced Carbon Steel Sheets and Strip", JIS (Japanese Industrial Standard) G 3141, 1996, pp. 291-314.

"Hot-dip Zinc-coated Steel Sheets and Coils", JIS (Japanese Industrial Standard) G 3302, 1998, pp. 315-365.

"Specimen Dimensions and Procedure for Shear Testing Resistance Spot and Embossed Projection Welded Joints", JIS (Japanese Industrial Standard) Z 3136, 1999, pp. 786-791.

M. Fujii et al., "YAG Laser Welding of Dissimilar Metal (Aluminum Alloy and Mild Steel)", Preprints of National Meeting of Japan Welding Society, vol. 61, 1997, pp. 380-381.

USPTO Office Action, U.S. Appl. No. 12/812,878, Jul. 17, 2012.

USPTO Notice of Allowance, U.S. Appl. No. 12/812,878, Mar. 19, 2013, 8 pages.

USPTO Office Action, U.S. Appl. No. 12/812,878, Nov. 1, 2012, 14 pages.

Japanese Office Action dated Feb. 21, 2013 (5 pgs), partial English Translation.

* cited by examiner

CENTER OF JOINING SECTION

TERNARY EUTECTIC
MELTING METAL
+ OXIDE FILM

SITE AROUND JOINING SECTION

DISSIMILAR METAL JOINING METHOD FOR MAGNESIUM ALLOY AND STEEL

TECHNICAL FIELD

This invention relates to a method for joining dissimilar metals which are magnesium alloy and steel as a combination of dissimilar metals which are metallurgically difficult to be directly joined to each other while an oxide film is present at the joining surface thereof.

BACKGROUND OF INVENTION

When dissimilar metals are joined to each other, joining in air is difficult in case that an oxide film is present at the surface of magnesium alloy material while oxide film at the surface of steel grows at the step of heating during joining, as in the combination of magnesium alloy material and steel.

Additionally, magnesium and steel exhibit a two-phase separation type while a solubility limit to each other is very small as seen from a Fe—Mg binary phase diagram, and therefore it is metallurgically very difficult to directly join materials having such characteristics, to each other.

Accordingly, hitherto in case of using such dissimilar metal materials as magnesium-based material and steel upon combination thereof, mechanical fastening with bolts, rivets or the like is employed (see, for example, Patent Citation 1).

PRIOR ART CITATIONS

Patent Citation

Patent Citation 1: Japanese Patent Provisional Publication No. 2000-272541 publication

SUMMARY OF INVENTION

Problems to be Solved by Invention

However, according to a method described in the above-mentioned Patent Citation 1, the number of parts used in joining increases thereby providing such a problem as to increase weight and cost of a jointed member.

The present invention has been made in view of the above-mentioned problems in joining dissimilar metals. An object of the present invention is to provide a dissimilar metal joining method by which a firm joining can be made regardless of the fact that an oxide film is present at a joining surface and regardless of the combination of magnesium alloy material and steel which are difficult to be directly metallurgically joined to each other.

Means for Solving Problems

The present inventors have made many eager studies. As a result, they have found that oxide film can be removed from a joining interface at a low temperature by providing a third material between two dissimilar metal materials to be joined to each other so as to bring about ternary eutectic reaction between at least one of the two materials and a metal containing in the third material. Additionally, the inventors have found that the above-mentioned problems can be solved by providing to a joining interface a layer containing an intermetallic compound including a main component metal of at least one of the two materials, and have reached the completion of the present invention.

Specifically, the present invention is based on the above-mentioned knowledge, in which a method for joining dissimilar metals which are magnesium alloy and steel is characterized by comprising providing a third material containing zinc, magnesium and aluminum, between magnesium alloy material and steel to give rise to Zn—Al—Mg ternary eutectic melting so that reaction product due to the eutectic melting is discharged from a joining interface while at least one of Al—Mg intermetallic compound and Fe—Al intermetallic compound is formed at the joining interface to join the magnesium alloy and the steel through a compound layer containing the intermetallic compound.

Additionally, in a structure for joining dissimilar metals which are magnesium alloy and steel, the newly generated surfaces of magnesium alloy material and steel material are joined through a compound layer to each other, the compound layer including at least one of Al—Mg intermetallic compound and Fe—Al intermetallic compound. Reaction product due to Zn—Al—Mg ternary eutectic melting is present around the compound layer.

Effects of Invention

According to the present invention, the third material containing zinc and aluminum for giving rise to ternary eutectic melting with magnesium is present between magnesium alloy material and steel, thereby causing Zn—Al—Mg ternary eutectic melting when joining is made. Accordingly, if oxide film for hampering joining is formed at the joining surface, the oxide film can be easily removed from the joining interface at an extremely low temperature.

Additionally, a layer containing intermetallic compound formed between one or both of Mg and Fe which are respectively main component metals of the joined materials and Al contained in the third materials is present between the joined materials, so that mutual diffusion is made possible between the joined materials which are difficult to be metallurgically directly jointed to each other, thereby attaining a firm joining.

MODE FOR CARRYING OUT INVENTION

Hereinafter, a method for joining dissimilar metals which are magnesium alloy and steel, according to the present invention will be further discussed in detail and specifically.

In the present specification, "%" means percent by mass unless otherwise specified. Additionally, "main component" means a component which is the most contained in a material.

In the present invention, as discussed above, when magnesium alloy material containing Mg as the main component and steel containing Fe as the main component are joined to each other, a third material containing Zn as the main component and Mg and further containing Al which gives rise to ternary eutectic melting between it and these Zn and Mg is present between the two materials.

When joining is made, Zn—Al—Mg ternary eutectic melting is caused so as to discharge reaction product thereof from a joining interface while intermetallic compound is produced between Mg and Al and/or between Fe and Al, in which magnesium alloy material and steel are joined to each other through a compound layer containing such intermetallic compound.

Accordingly, even if oxide film of Mg serving as a joining inhibiting factor is present at a joining interface, it can be easily removed from the joining interface not only at the melting point of joined materials but also at a temperature further lower than a binary eutectic point.

Figure 1:
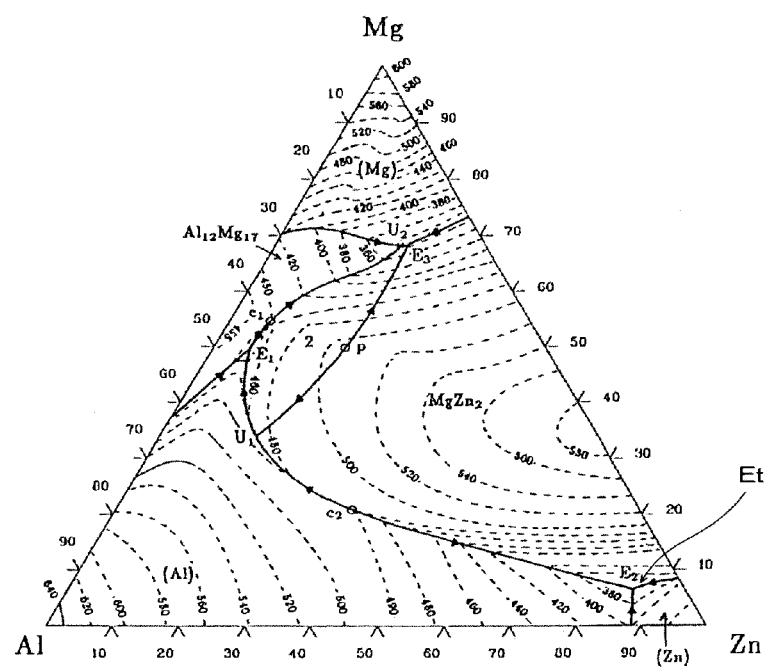
[FIG. 1] is a ternary phase diagram showing a ternary eutectic point of Al—Mg—Zn alloy.

Specifically, FIG. 1 shows a ternary phase diagram of Al—Mg—Zn alloy, in which Al—Mg—Zn alloy has a ternary eutectic point Et representing the composition of 7.0% Al-8.1% Mg-84.9% Zn in atomic percent. The melting point in this ternary eutectic composition is 337° C. which is lower than the melting point 660° C. of Mg and further lower than the temperature 364° C. of the ternary eutectic point in Mg—Zn.

Accordingly, oxide film and other foreign substances present at the joining surface can be discharged together with ternary eutectic reactant from the joining interface at a further lower temperature, thereby suppressing production of excessive intermetallic alloy (Fe—Al compound or Al—Mg compound) thus making a firm joining possible. For example, in case of resistance welding discussed after, a larger nugget can be formed at a lower current, thereby making it possible to obtain a high joining strength.

The composition at the above-mentioned ternary eutectic point Et becomes 3.2% Al-3.3% Mg-93.5% Zn when converted to percent by mass.

In the method for joining dissimilar metals, according to the present invention, intermetallic compound is produced between the main component metal of the joined materials and Al when joining is made, so that a compound layer containing such intermetallic compound is present at the joining interface, and therefore diffusion is made possible in the combination of magnesium alloy and steel which are difficult to be metallurgically directly joined, thereby improving a joining strength.

In the method for joining dissimilar metals which are magnesium alloy and steel, according to the present invention, a concrete measure for allowing the above-mentioned third material to be present between the two joined materials is preferably coating measure such as plating, spaying, vapor deposition, film coating and/or the like, by which the third material is attached to the joining surface.

In other words, by attaching the third material to a clean surface of steel after cleaning, a coating layer molten under the ternary eutectic reaction is discharged together with oxide film at the surface and impurities to a site around the joining section. Thereafter, a very clean newly generated surface appears from the bottom of the coating layer thereby making firm joining possible.

additionally, in the method for joining dissimilar metals, according to the present invention, aluminum may be previously added to the magnesium alloy material.

By doing this, a sufficient amount of Al can be supplied to the joining interface when the intermetallic compound is produced during joining, so that the intermetallic compound between Mg or Fe of the main component metal of the joined materials and Al can be securely formed, thereby making a firmer joining.

Further, the component composition of the third material is preferably Zn—Al—Mg ternary eutectic composition mentioned above or a composition having a Al content more than that of this composition so that, for example, an alloy composition of 6-20% Al-1-4% Mg—Zn may be employed.

By this, eutectic melting can be further securely caused at a further lower temperature than in case of binary eutectic melting. Additionally, since the third material contains much Al, Al added to the third material is used when the intermetallic compound including Al is formed at the joining interface, and therefore the amount of Al for forming the intermetallic compound is sufficient, thereby making it possible to obtain a more firm joining section.

In the method for joining dissimilar metals, according to the present invention, a compound layer containing intermetallic compound including Al is present at the joining interface. At this time, this compound layer preferably contains both Al—Mg intermetallic compound (for example, $Al_3Mg_2$) and Fe—Al intermetallic compound (for example, $FeAl_3$) as mentioned above, and it is further preferable that these intermetallic compounds are mixed to form a composite layer.

Bonding means to be used in the method for joining dissimilar metals, according to the present invention is not particularly limited as far as it can relatively press magnesium alloy material and steel in a condition where the third material is present between the magnesium alloy material and the steel while it can heat the joining interface at a temperature not lower than the ternary eutectic temperature.

As a practical joining apparatus, for example, a diffusion bonding apparatus, a laser welding apparatus including a laser beam irradiation head and a pressure roller, or the like can be used, in which it is particularly preferable to apply spot welding or seam welding under resistance welding. According to such resistance welding, the joining interface can be easily heated to a temperature not lower than the ternary eutectic temperature while both the materials are being relatively pressed, thus making it possible to carry out the dissimilar material joining of the present invention by using existing facilities.

Figure 2:
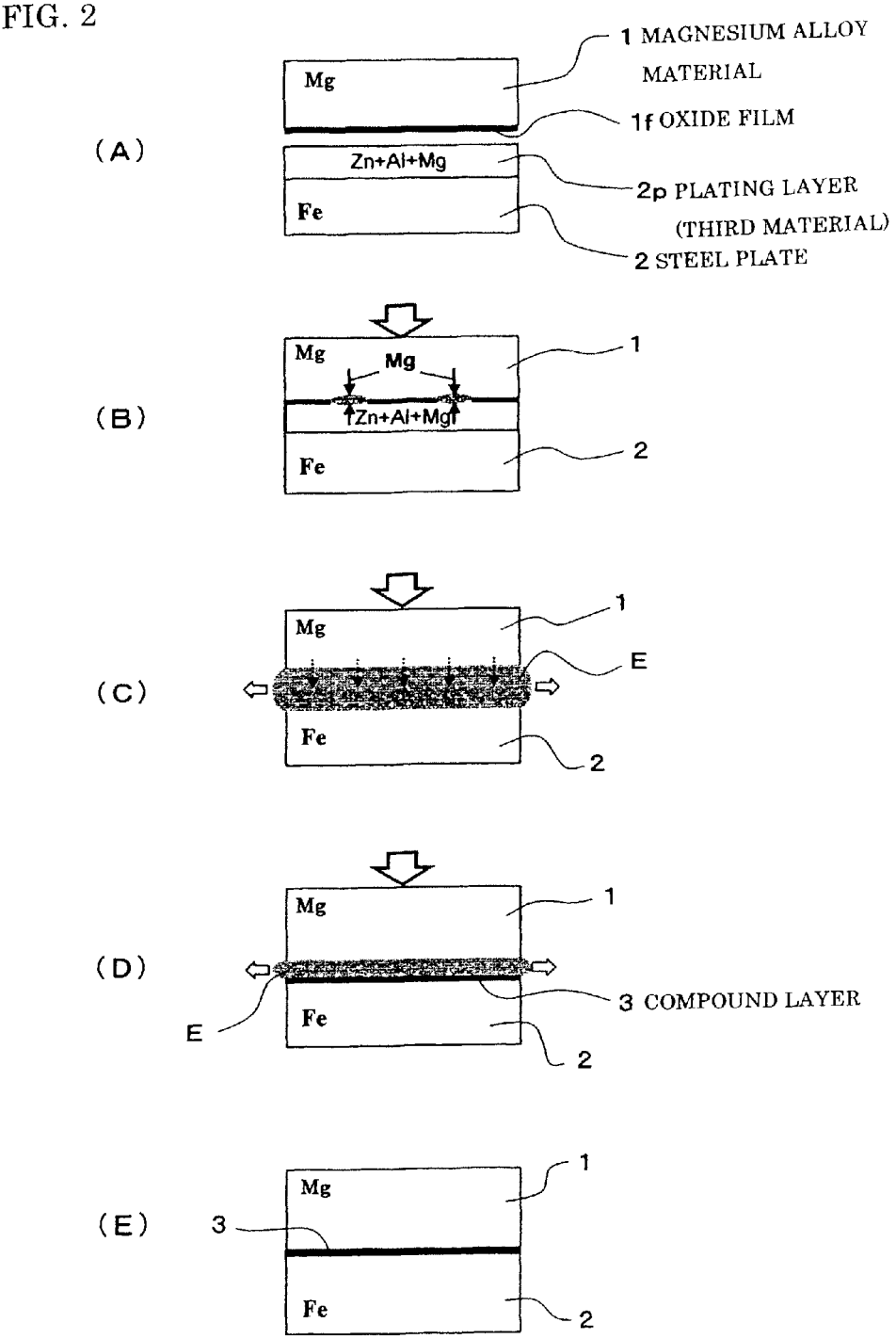
[FIG. 2] including (A) to (E) is a process chart which schematically illustrates a joining process in a joining method for dissimilar metals, according to the present invention.

(A) to (E) of FIG. 2 are schematic illustrations for steps, showing a joining process of magnesium alloy material and steel according to the method for joining dissimilar metals, of the present invention.

First, as shown in (A) of FIG. 2, a steel plate 2 provided with a Al—Mg—Zn alloy plating layer (third material) 2*p* located at least at a surface on the side of a joining interface, and a magnesium alloy material 1 are prepared. Oxide film 1*f* is produced at the surface of the magnesium alloy material 1.

As shown in (B) of FIG. 2, these steel plate 2 and magnesium alloy material 1 are put one upon another in such a manner that the alloy plating layer 2*p* is located inside, upon which relative pressing, loading thermal impact, and/or heating are made as indicated by an arrow in (B) of FIG. 2. This gives rise to a plastic deformation or the like which locally breaks the oxide film 1*f*.

When the oxide film 1*f* is broken, Mg in the magnesium alloy material 1 is locally brought into contact with Al—Mg—Zn alloy plating layer 2*p*, thereby giving rise to ternary eutectic melting E of Al—Mg—Zn as shown in (C) of FIG. 2 upon maintaining a certain temperature condition, so that the oxide film 1*f* at the surface of the magnesium alloy material 1 is gradually effectively removed. In this case, on account of the ternary eutectic melting, the ternary eutectic reaction is made at an extremely low temperature such as 337° C.

As shown in (D) of FIG. 2, the oxide film 1f and impurities (not shown) at the joining interface are discharged together with the eutectic melting product E to a site around the joining section upon being pressed. At this time, Zn and Mg are preferentially molten and discharged at the joining interface under the eutectic melting. As a result, Al component added to the magnesium alloy remains, so that a relatively Al-rich phase is formed only at the joining interface. Further, this Al atom reacts with Fe and Mg to form the compound layer 3 containing intermetallic compounds of Al—Mg and Fe—Al.

Further, upon lapse of a joining time, as shown in (E) of FIG. 2, Al—Mg—Zn eutectic melting product formed at the interface is completely discharged, so that the compound layer 3 containing the intermetallic compounds as mentioned above is present at the joining interface. By this, the newly generated surfaces of the magnesium alloy material 1 and the steel plate 2 are joined to each other through the above-mentioned compound layer 3, thereby completing a firm joining.

In this example, a zinc layer does not remain at the joining interface after joining. This is a factor for obtaining the firm joining between the magnesium alloy 1 and the steel plate 2; however, this requires certain pressing, temperature and time required for the reaction and the discharging, requiring a thickness of the plating layer 2p of the steel plate 2 which thickness is determined taking account of an amount of the plating layer to be consumed by the ternary eutectic reaction.

Figure 3:
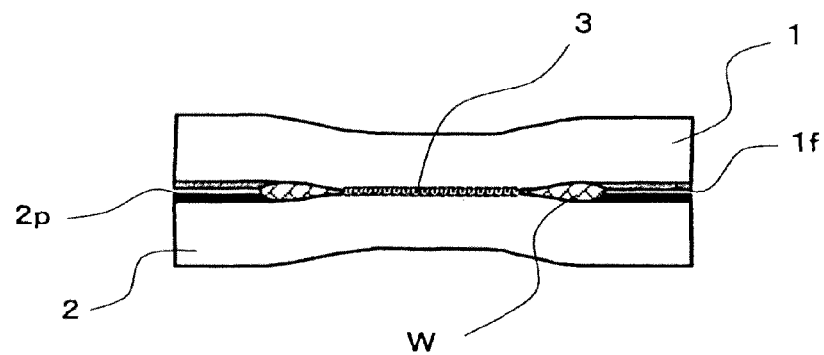
[FIG. 3] is a schematic sectional view showing a joining structure for a lapped joint by a spot joining to which the joining method according to the present invention is applied.

FIG. 3 shows a joining section structure of a connecting joint by a spot joining to which the above-mentioned method is applied, in which the magnesium alloy material 1 provided at its surface with the oxide film if is put on the steel plate 2 provided with the Al—Mg—Zn alloy plating layer 2b which is located at least at the surface on the side of the joining interface.

Additionally, as discussed above, the compound layer 3 containing Al—Mg intermetallic compound (for example, $Al_3Mg_2$) mentioned above and Fe—Al intermetallic compound (for example, $FeAl_3$) is formed at the joining surface, so that the magnesium alloy material 1 and the steel plate 2 are joined through this compound layer 3. At this time, oxides resulting from the oxide film 1f and impurities at the joining interface are discharged together with the ternary eutectic molten matter containing the Al—Mg—Zn alloy plating layer 2p of the steel plate 2 in such a manner to surround this joining section, so as to be present as a discharged matter W between both the plate materials 1, 2.

EXAMPLES

Hereinafter, the present invention will be discussed in detail with reference to Examples.

When joining of dissimilar metals which are magnesium-based material and steel was made, a steel plate plated with 11% Al-3% Mg—Zn alloy serving as a third material was used as a steel material. As a magnesium alloy material, AZ31 alloy (3% Al-1% Zn) containing aluminum was prepared. These steel material and magnesium alloy material were joined under a variety of conditions, on which researches were made on obtained relationships between interface structures and strengths, and comparisons were made to cases of using galvanized steel plates. Here, the magnesium alloy material and the steel plate used had respectively a thickness of 1.0 mm and a thickness of 0.55 mm.

Figure 4:
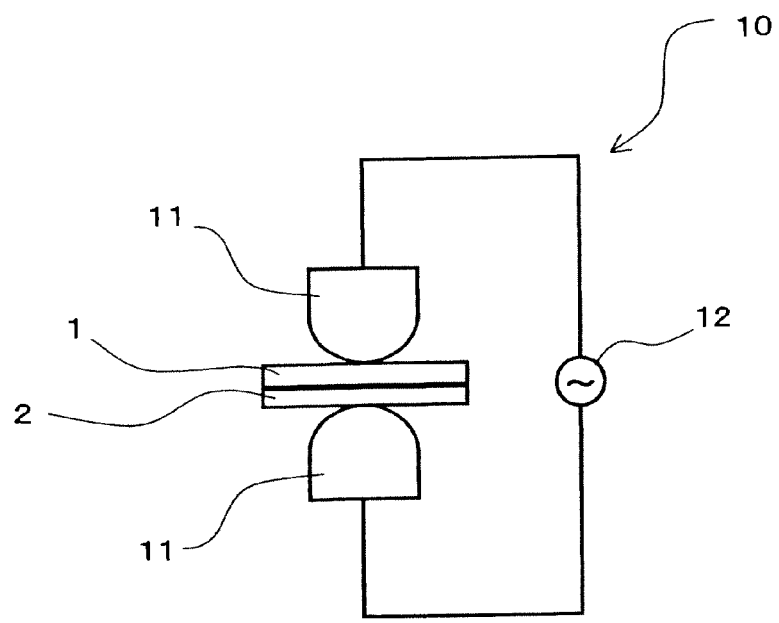
[FIG. 4] is a schematic view showing the structure of a resistance spot welding apparatus which is used for Examples of the present invention.

FIG. 4 is a schematic illustration of a resistance spot welding apparatus used in the Examples. A joining apparatus 10 shown in the figure is proved with a pair of electrodes 11 and can accomplish joining by using heat generated under the action of electric resistance at the joining interface by supplying electric current from an electric current source 12 for a certain time while a magnesium alloy material 1 and a plated steel plate 2 were pressed at a certain pressure by the electrodes 11. The electrodes 11 used were formed of chromium copper and had a tip end curvature radium R of 40 mm.

Joining conditions were as follows: A pressure of pressing was 300 kgf; a welding current value was 10000 to 30000 A; and a joining time was 12 cycles (240 ms). After joining, in order to measure a joint strength, a shear tensile test was made thereby evaluating a strength.

Additionally, the composition and the like of reaction layer at the joining section interface were investigated by using a scanning electron microscope, an energy dispersive X-ray analysis and an X-ray diffractometer.

Results of these are shown in Table 1. Concerning joining results in the table, one having a tensile shearing strength of not lower than 1.2 kN was evaluated as "○", and one having a tensile shearing strength of lower than 1.2 kN was evaluated as "X".

TABLE 1

Figure 5:
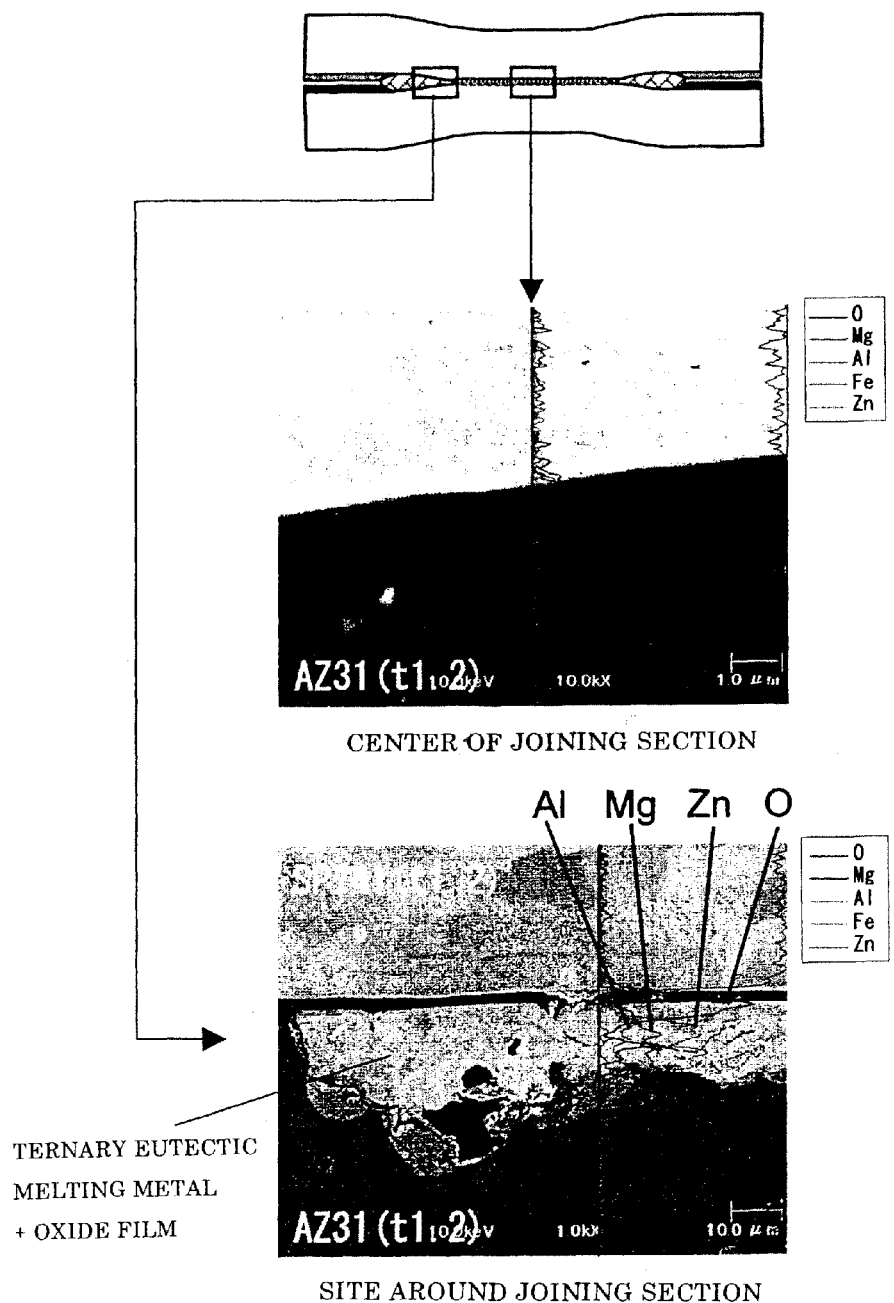
[FIG. 5] is a view showing a SEM image and an Auger analysis result at a site near a joining section obtained by Example 2 of the present invention.

| Item | Joined materials | | Joining current value (A) | Nugget diameter (μm) | Tensile shearing strength (kN) | Joining result | Reference |
| --- | --- | --- | --- | --- | --- | --- | --- |
| | Steel material | Mg alloy material | | | | | |
| Comparative Example 1 | Galvanized steel plate | AZ31 | 10000 | 3.6 | 0.44 | X | |
| Comparative Example 2 | Galvanized steel plate | AZ31 | 15000 | 4.7 | 0.63 | X | |
| Comparative Example 3 | Galvanized steel plate | AZ31 | 20000 | 5.7 | 0.82 | X | |
| Comparative Example 4 | Galvanized steel plate | AZ31 | 25000 | 6.6 | 1.12 | X | |
| Example 1 | Al—Mg—Zn alloy plated steel plate | AZ31 | 15000 | 7.2 | 1.43 | ○ | |
| Example 2 | Al—Mg—Zn alloy plated steel plate | AZ31 | 20000 | 9.3 | 1.50 | ○ | FIG. 5 |
| Example 3 | Al—Mg—Zn alloy plated steel plate | AZ31 | 25000 | 10.2 | 1.48 | ○ | |

TABLE 1-continued

| Item | Joined materials | | Joining current value (A) | Nugget diameter (µm) | Tensile shearing strength (kN) | Joining result | Reference |
|---|---|---|---|---|---|---|---|
| | Steel material | Mg alloy material | | | | | |
| Example 4 | Al—Mg—Zn alloy plated steel plate | AZ31 | 30000 | 10.8 | 1.36 | ○ | |

As shown in Table 1, it is understood that a high joining strength cannot be obtained if the current value in the resistance welding is not raised to 30000 A in Comparative Examples 1 to 4 in which the galvanized steel plate was used.

To the contrary, it was confirmed that a large nugget diameter could be obtained so that a high strength was obtained even at the current value of about 15000 A lower than that in Comparative Examples, in Examples 1 to 4 according to the present invention and using Al—Mg—Zn alloy plated one as the steel plate.

Specifically, as shown in Example 1, the strength equal to or more than the tensile shearing strength of Comparative Example 4 obtained at the current value of 30000 A could be obtained at 15000 A. According to the present invention, it was confirmed that the equal strength could be obtained at the current value of ½.

Additionally, concerning nugget diameter, the nugget diameter equal to the value of Comparative Example 4 obtained at the current value of 30000 A could be obtained at 15000 A, according to Example 1. According to the present invention, the equal nugget diameter could be obtained at the current value of ½.

FIG. 5 shows results of SEM (scanning electron microscope) observation and of Auger analysis on the center of the joining section according to Example 1 mentioned above and its peripheral section as an example of the joining structure according to the present invention, in which a nano-level thin composite layer of Fe—Al and Al—Mg was formed at the center of the joining section.

Additionally, it is understood that the oxide film is discharged together with Al—Mg—Zn ternary eutectic melting metal to the periphery of the joining section.

In Examples mentioned above, while the resistance spot welding apparatus has been described to be used as means for heating and pressing the welded materials when the joining is made, the means is not particularly limited to these, so that all joining methods which can precisely control the temperature of the joining interface may be applied without hindrance. In addition to the resistance welding, usually used apparatus such as laser welding, high-frequency welding, friction agitation joining, supersonic joining, diffusion joining or the like can be used, so that it is not required to prepare a new heat source for this purpose, which is economical.

Additionally, concerning measures for attaching the Al—Mg—Zn alloy layer to the surface of the steel plate, they are not limited to only plating and therefore coating measures such as spraying, deposition, powder deposition and the like may be used.

EXPLANATION OF REFERENCE

1 magnesium alloy material
1f oxide film
2 steel plate
2p Al—Mg—Zn alloy plating layer (third material)
3 compound layer

The invention claimed is:

1. A structure for joining dissimilar metals comprising a magnesium alloy and steel material, the structure comprising:
a compound layer formed at a joining interface between the magnesium alloy material and steel material such that newly generated surfaces of the magnesium allot material and the steel material are joined to each other through the compound layer, the compound layer including an Al—Mg intermetallic compound and Fe—Al intermetallic compound and being free of Zn; and
a reaction product caused due to Zn—Al—Mg ternary eutectic melting and containing an oxide film of Mg, the reaction product being is charged from the joining interface so as to be present around the compound layer.

2. A structure for joining dissimilar metals as claimed in claim 1, wherein a discharge matter containing the Zn—Al—Mg ternary eutectic melting reaction product is discharged around the compound layer.

* * * * *